United States Patent [19]

Novis et al.

[11] Patent Number: 4,885,514
[45] Date of Patent: Dec. 5, 1989

[54] ARRANGEMENT FOR CONTROLLING THE POSITION OF AN AIRCRAFT CONTROL SURFACE

[75] Inventors: Ari M. Novis, Rocky Hill; Don L. Adams, Fairfield; Troy J. LaMontagne, Wallingford; Albert Sivahop, Trumbull, all of Conn.

[73] Assignee: United Technologies Corporation, Hartford, Conn.

[21] Appl. No.: 138,618

[22] Filed: Dec. 24, 1987

[51] Int. Cl.$^4$ .............................................. G05D 3/12
[52] U.S. Cl. ..................................... 318/580; 318/564; 318/470; 244/194
[58] Field of Search ................... 318/580, 564, 470; 244/194

[56] References Cited

U.S. PATENT DOCUMENTS 4,079,902  3/1978  Ryzhko et al. ................... 244/75 R
4,291,260  9/1981  Nixon .................................. 318/331

Primary Examiner—William M. Shoop, Jr.
Assistant Examiner—Saul M Bergmann
Attorney, Agent, or Firm—Peter R. Ruzek

[57] ABSTRACT

An arrangement for controlling the position of a movable member, especially an aircraft control surface member, includes an operational amplifier and a capacitor connected in parallel to the amplifier. The control arrangement further includes a detector which detects the restoration of the supply of electric power following its interruption and generates a limited-duration pulse. This pulse is then used to close a switch, which is interposed between an input terminal of the capacitor and the ground, for the duration of this pulse, so that the capacitor is charged much more rapidly than otherwise. The output signal of the combination of the operational amplifier and the capacitor is supplied to an actuator for the movable member so that the extent of excursion of the movable member out of its desired position after the electric power supply has been restored is minimized.

14 Claims, 3 Drawing Sheets

POWER
SUPPLY

INPUT
SIGNAL

ENERGY
STORAGE
VOLTAGE

OUTPUT
SIGNAL

MOVABLE
MEMBER
POSITION

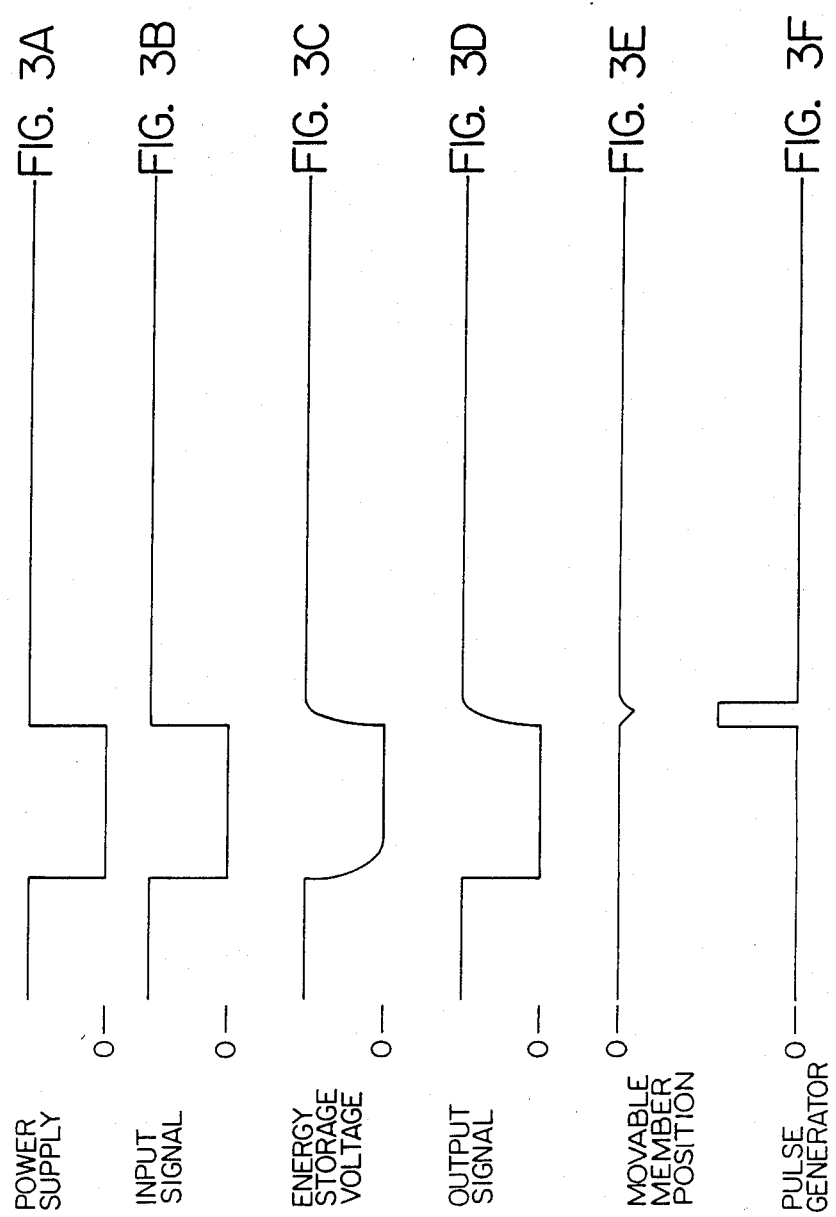

ARRANGEMENT FOR CONTROLLING THE POSITION OF AN AIRCRAFT CONTROL SURFACE

The Government has rights in this invention pursuant to a contract awarded by the Department of the Army.

TECHNICAL FIELD

This invention relates to arrangements for controlling the positioning of movable members in general, and more particularly to an arrangement for controlling the position of a movable aircraft airfoil member and especially an aircraft control surface member.

BACKGROUND ART

The position of an aircraft can be controlled through the use of one or more variable incidence control surface members. By moving these control surface members, changes in aircraft position can be induced, and unwanted aircraft positions can be corrected.

Typically, to reduce pilot workload, the incidence of the control surface member can be adjusted by an actuating device, which can be controlled automatically in dependence on a control signal issued by a signal processor on the basis of input parameters such as aircraft position, aircraft acceleration, airspeed, pilot stick inputs, etc., to control the aircraft position as desired.

For obvious reasons, the aircraft control surface member actuator must not be permitted to react to temporary deviations, but it must readily respond to gradual changes, in the input signal values, as sensed by the input sensors. To achieve such conditions, it has been proposed to subject the signal that are subject to such relatively rapid deviations to a low-pass filtering action.

In a typical implementation of this approach, a relatively large-capacity capacitor is connected in parallel with an operational amplifier that is arranged between the output of the sensor or sensors in question and the signal processor and which is charged, on the one hand, by the incoming unfiltered sensor signal issued by the sensor or sensors and, on the other hand, by the amplified sensor signal appearing at the output of the operational amplifier. A control arrangement of this type operates well and accomplishes its intended purpose so long as the supply of electric energy to the electrical system and particularly to the operational amplifier is uninterrupted. However, when using this control arrangement type, the capacitor is relatively quickly discharged, usually through the operational amplifier, if the electric power supply is interrupted. This means that, when the supply of the electric power is restored following such interruption, the signal supplied to the actuator that positions the aircraft control surface member may be incorrect in the sense that it will not have the value it would have had were it not for the interruption, in all cases except where the signal to the actuator was at a value corresponding to the value when the capacitor was discharged before the power interruption. This, in turn, means that an output signal which appears at the juncture of the output of the operational amplifier with the corresponding terminal of the capacitor and which controls, usually in conjunction with other parameters, the actuator that positions the aircraft control surface member, may cause the latter to adjust the this control surface member to an incorrect position, even though the input signal supplied by the input sensor or sensors may call for a different position of the aircraft control surface member. This undesirable condition will prevail until the capacitor is charged to such a level that the output signal supplied to the actuator has a value corresponding to the instantaneous position of the aircraft control surface member that it positions, whereupon the direction of movement of the aircraft control surface member is reversed by the actuator in response to further charging of the capacitor and corresponding increase in the value of the aforementioned output signal.

It is obvious that the above-described situation can have undesirable effects in the control of the aircraft, in that the control functions of the aircraft control surface member may be impaired for a period following the restoration of the electric power.

Accordingly, it is a general object of the present invention to avoid the disadvantages of the prior art.

More particularly, it is an object of the present invention to develop an arrangement for controlling the position of an aircraft control surface member, which arrangement does not possess the disadvantages of the known arrangements of this type.

Still another object of the present invention is so to construct the arrangement of the type here under consideration as to be able to automatically recognize the restoration of the electric power supply following interruption and to modify the position of the aircraft control surface member in response to such recognition in such a manner as to avoid the incorrect position of the aircraft control surface member.

It is yet another object of the present invention to design the above arrangement in such a manner as to be relatively simple in construction, inexpensive to manufacture, easy to use, and yet reliable in operation.

A concomitant object of the present invention is to provide an arrangement for controlling the operation of an actuator which adjusts the position of a movable member in such a manner that a temporary interruption of electric power supply will result only in a negligible, if any, change in the position of the movable member, regardless of the duration of the interruption.

DISCLOSURE OF THE INVENTION

The above objects and others which will become apparent hereafter are achieved by an arrangement for controlling the position of an aircraft control surface member. This controlling arrangement includes, as its basic components, means for supplying electric power; means for issuing an electric input signal having a value that is indicative of the desired position of the control surface member at least while electric power is being supplied by the supplying means; means for amplifying the input signal, including an input receiving the input signal and an output; means connected to the output of the amplifying means at a juncture and operative for conducting an output signal received from the juncture; means connected to the conducting means and operative for positioning the control surface member in dependence on the output signal; and means for storing electric energy, including one terminal connected to the input of the amplifying means and another terminal connected to the juncture, the storing means being discharged upon interruption of the supply of electric power by the supplying means and only gradually recharged upon restoration of such supply so that, immediately after such restoration, the output signal may have an improper value differing from a proper value which the output signal would have in the absence of the interruption, with attendant repositioning of the control surface member by the positioning means toward its position corresponding to such incorrect value of the output signal. The controlling arrangement of the present invention further includes means for detecting the restoration of the supply of electric power by the supplying means and issuing a switching signal for a predetermined time interval immediately following such restoration; and means for rapidly recharging the storing means to the correct value immediately after the restoration, including means for grounding the one terminal of the storing means in response to and for the duration of the switching signal.

According to another aspect of the present invention, there is provided an arrangement for controlling an actuator that adjusts the position of a movable member in dependence on the value of an electric control signal when electric power is being supplied thereto from a source, this controlling arrangement including means for amplifying the control signal, including an input receiving the control signal and an output; means connected to the output of the amplifying means at a juncture and operative for conducting an output signal received from the juncture to the actuator; means for storing electric energy, including one terminal connected to the input of the amplifying means and another terminal connected to the juncture, the storing means being discharged upon interruption of the supply of electric power by the source and only gradually recharged upon restoration of such supply so that, immediately after such restoration, the output signal may have an improper value differing from a proper value which the output signal would have in the absence of the interruption, with attendant repositioning of the movable member by the actuator toward its position corresponding to such incorrect value of the output signal; means for detecting the restoration of the supply of electric power by the source and issuing a switching signal for a predetermined time interval immediately following such restoration; and means for rapidly recharging the storing means to the correct value immediately after the restoration, including means for grounding the one terminal of the storing means in response to and for the duration of the switching signal.

A particular advantage of the arrangement of the present invention is that the electric energy storing means is rapidly recharged immediately after the restoration of the electric power supply to its correct value, that is, to the value which it would have had in the absence of the interruption, so that the effect of a temporary deviation of the signal which controls the actuator from its correct value on the position of the movable member, especially the aircraft control surface member, will be negligible.

BRIEF DESCRIPTION OF THE DRAWING

The present invention will be described in more detail below with reference to the accompanying drawing in which:

FIGS. 3a to 3f are graphic representations respectively corresponding to those of FIGS. 2a to 2e and of an additional parameter encountered during the use of the control circuitry of FIG. 1 when employing the present invention.

BEST MODE FOR CARRYING OUT THE INVENTION

Figure 1:
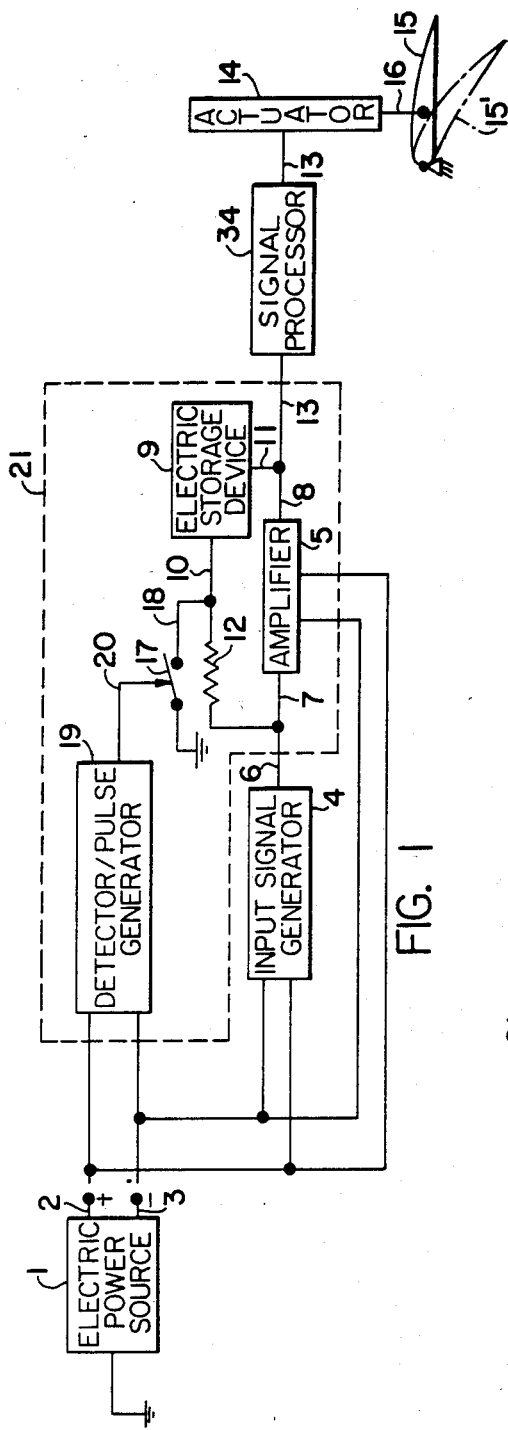
FIG. 1 is a somewhat simplified circuit diagram of a control circuitry according to the present invention and of an aircraft control surface member controlled thereby.

Referring now to the drawing in detail, and first to FIG. 1 thereof, it may be seen that the reference numeral 1 has been used therein to identify an electric power supply or source. The electric power supply 1 has a positive terminal 2 and a negative terminal 3 which carry voltages that are respectively above and below the ground level when the electric power source 1 is operational, and at the ground level substantially immediately after the electric power supply 1 ceases to operate and until the supply of the electric power is restored.

The voltages appearing at the terminals 2 and 3 are supplied, on the one hand, to an input signal generator 4 and, on the other hand, to an amplifier 5. The input signal generator 4 has a known construction, for instance that of an input sensor, and is operative for issuing an input signal that is supplied through a connecting line 6 to an input 7 of the amplifier 5. The amplifier 5, which is also of a known construction, amplifies the input signal which appears at its input 7 and issues an amplified signal at its output 8.

An electric storage device 9 is connected in parallel with the amplifier 5, that is, its one terminal 10 is connected through a resistor 12 having a relatively small resistance with respect to the resistance of the input of the amplifier 5, such as, for instance, 100 ohm, to the input 7, and its other terminal 11 is coupled with the output 8, of the amplifier 5. This means that the electric storage device 9 will be charged and discharged in dependence on the voltages appearing at its terminals 10 and 11 which, in turn, are dependent on the voltages appearing at the junctures of the connecting line 6 with the input 7 of the amplifier 5, on the one hand, and of the output 8 of the amplifier 5 with the other terminal 11 of the electric storage device 9.

The latter juncture is connected by a connecting line 13 and through a signal processor 34 which is interposed in the connecting line 13 with an electrically operated actuator 14. The signal processor 34 is of a known construction and is operative for processing the signal supplied thereto by the connecting line 13, usually in conjunction with other signals indicative of other flight parameters or critical conditions, such as accelerations, attitudes etc., in a well known manner which need not be addressed here, to issue an ultimate driving signal which is a function of the output signal issued by the combination of the electric storage device 9 and the amplifier 5 and which controls the operation of the actuator 14. In this context, it should be mentioned that the output signal of the signal processor 34 need not necessarily be a linear function of its input signal; rather, it could be a combination of discrete, discontinuous, and complex functions.

The actuator 14, which is also of a known construction, is shown to be connected with a pivotable control surface member 15 by means of a mechanical actuating member 16, for the purpose of illustration only and not necessarily as an indication of the actual manner in which the actuator 14 is connected with or acts on the control surface member 15. The position of the control surface member 15 is adjusted in response to the operation of the actuator 14 between its first position shown in full lines and its second position shown in broken lines and indicated at 15'. The control surface member 15 assumes, or is caused by the actuator 14 to move towards, its first position when the electric storage device 9 is fully charged, and it assumes, or is caused by the actuator 14 to move towards, its second position 15' when the electric storage device 9 is fully discharged. If the supply of electric power is interrupted, the actuator 14 maintains the control surface member 15 in its position assumed prior to such interruption.

The electric storage device 9 is capable of storing relatively large amounts of electric energy, so that the combination of the amplifier 5 with the electric storage device 9 exhibits low-pass filter characteristics with a relatively large time constant on the order of, for instance, 3 seconds. This means, on the one hand, that all temporary deviations of the input and output signals of this combination from an average value are smoothened or filtered out while gradual changes in the input signal are reflected in the output signal, as is desired. However, this also means, on the other hand, that the charging of the electric storage device 9 from its discharged condition will be only gradual and relatively slow, in accordance with the aforementioned time constant.

This gradual charging is not detrimental and may even be desirable when the discharged condition of the electric storage device 9 has been previously achieved because it was desired for the control surface member 15 to assume its second position 15', inasmuch as it assures that the position of the control surface member 15 does not change abruptly. However, if the discharge occurs while the control surface member 15 is in its first position, as it does after interruption of the supply of electric power, the relatively long time it takes to charge the aforementioned combination (it takes about five time constants for the output signal supplied to the actuator 14 to rise to within 1% of the value it would have had for the same input signal value were it not for the interruption) is a pronounced detriment, since this incorrect or improper value of the output signal causes the actuator 14 to pivot the control surface member 15 for a relatively long period of time towards its second position 15' after the electric power supply has been restored, even if the original control or input signal calls for a first position of the control surface member 15. As mentioned before, this may result in an unintended positioning of the control surface member 15.

When a temporary interruption of the electric power supply occurs, the voltages at the terminals 2 and 3 will move to the ground potential and the electric energy storage device 9 will be discharged as well, usually through the amplifier 5 which derives its electric power from the terminals 2 and 3 of the electric power source 1, to the ground potential where it will stay until after the electric power supply has been restored.

Figure 2A:
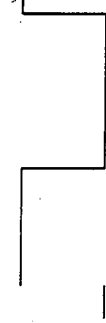
FIGS. 2a to 2e are graphic representations of the dependences of various operating parameters of an electric control circuitry which controls the operation of an aircraft control surface member without resorting to the use of the present invention.
Figure 2B:
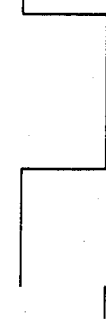
Figure 2C:
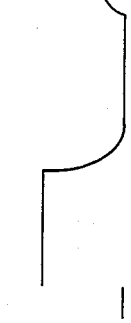
Figure 2D:
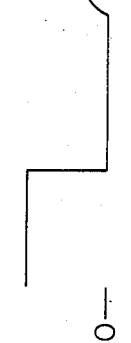
Figure 2E:

The conditions encountered during the operation of the control arrangement as described so far are graphically depicted in FIGS. 2a to 2e of the drawing for a situation where it is desired for the control surface member 15 to be in its first position and where the electric power supply is first interrupted and subsequently restored. When the electric power supply is interrupted (FIG. 2a), the voltage of the input signal appearing at the output of the generator 4 follows the same course (FIG. 2b) and the charge of the electric energy storage device 9 drops off rapidly (FIG. 2c), as does the output signal (FIG. 2d) which is supplied to the actuator 14. However, as mentioned before, the control surface member 14 ordinarily remains in its first position for the entire duration of the electric power supply interruption (FIG. 2e).

Once the supply of electric power is restored following such interruption (FIG. 2a), the voltage of the input signal issued by the generator 4 (FIG. 2b) immediately rises to its original level. However, the electric energy storage device 9 is in its discharged condition and will be charged only gradually and relatively slowly after such restoration in accordance with the time constant (FIG. 2c). This means that the output signal supplied to the actuator 14 (FIG. 2d), which at this time follows the same course as the charge of the electric energy storage means (FIG. 2c), has a value that does not correspond to the value of the input signal (FIG. 2b) and that in fact initially calls for the second position of the control surface member 15, even though the input signal (FIG. 2b) calls for the first position of the control surface member 15. This means that the actuator 14 will pivot the control surface member 15 towards its second position, with the aforementioned undesirable effects. This pivoting of the control surface member 15 will be eventually stopped and reversed (FIG. 2e) when the control surface member 15 reaches its position corresponding to the instantaneous value of the output signal (FIG. 2d), but by this time the undesirable effects have already occurred. Moreover, even after such reversal, the movement of the control surface member 15 to its desired first position will be relatively slow, consistently with the rather substantial time constant.

To avoid this undesirable situation, it is proposed in accordance with the present invention to temporarily accelerate the charging of the electric energy storage device 9 of FIG. 1 immediately after the restoration of the electric power supply so as to minimize the extent of movement of the control surface member 15 towards its second position, if not eliminate such undesired movement altogether. This is achieved by providing a switch 17 that is interposed in an electric connecting line 18 whose one end is connected to the ground and whose other end leads to a juncture that is disposed between the one terminal 10 of the electric energy storage device 9 and the resistor 12. This switch 17 is normally open, so that the electric control arrangement described above, will operate in the previously explained manner. On the other hand, when the switch 17 is closed, the ground potential is supplied through the switch 17 to the one terminal 10 of the electric energy storage device 9 and this will result, as will be explained in more detail later, in a much faster charging of the electric energy storage device 9 than when the switch 17 is open. Accordingly, the value of the output signal supplied to the actuator 14 will rise equally fast and the control surface member 15 will be moved out of its first position, if at all, to a much smaller extent than when the switch 17 is open.

The operation of the switch 17 is controlled by a detector and pulse generator 19 which receives the voltages appearing at the terminals 2 and 3 of the electric power source 1 and issues a pulse of a limited duration immediately after it detects that the electric power supply has been restored following its interruption. This pulse is then used to close the switch 17 for its duration, as indicated by a line 20 which signifies this temporary actuation of the switch 17 to its closed position.

The presence and operation of the switch 17 will alter the operation of the electric input arrangement in the situation discussed above in conjunction with FIGS. 2a to 2e in a manner which will be readily apparent from FIGS. 3a to 3f where FIGS. 3a to 3e correspond, in that order, to FIGS. 2a to 2e, and FIG. 3f depicts the signal issued by the detector/pulse generator 19. It may be seen that, when the supply of electric power is restored, the pulse generator 19 commences to issue a limited-duration pulse (FIG. 3f). As mentioned before, this pulse closes the switch 17 which then remains closed for the duration of the pulse and thus connects the one terminal 10 of the electric storage device 9 to the ground. Consequently, the signal appearing at the output 8 of the amplifier 5 will charge the electric storage device 9 much more rapidly than in the absence of the switch 17 (FIG. 3d), and the output signal appearing in the connecting line 13 to the actuator 14 (FIG. 3e) follows suit. As a result, the excursion of the control surface member 15 from its first position (FIG. 3e) before the signal (FIG. 3d) supplied to the actuator 14 reaches its value corresponding to the instantaneous position of the control surface member 15 is so small as to be hardly perceptible. The duration of the pulse (FIG. 3f) is shown to be selected in such a manner that the electric storage device 9 is substantially fully charged (FIG. 3c) prior to the termination of the pulse. Once the pulse is terminated, the switch 17 is opened and the operation of the input arrangement is as if the switch 17 were not present at all.

Figure 4:
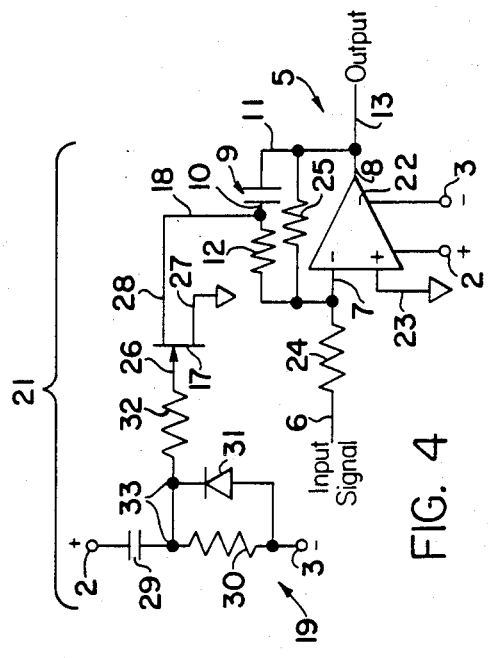
FIG. 4 is a circuit diagram of an exemplary implementation of the electric circuitry of FIG. 1.

The amplifier 5, the electric storage device 9, the resistor 12 and the detector/pulse generator 19, together with the various electrically conductive lines interconnecting such components, constitute an electric control circuit 21, a typical but not the only possible implementation of which is depicted in FIG. 4 of the drawing where the same reference numerals as before have been used to identify corresponding components and connections.

In this implementation, the amplifier 5 is an operational amplifier which includes, in addition to an amplifying device 22 proper which has a grounded positive input 23 and the input 7 which is a negative input and receives the initial input signal (from the input signal generator 4) through a resistor 24, a feedback loop extending between the output 8 and the negative input 7 and incorporating a feedback resistor 25. The electric energy storage device 9 is constituted by a capacitor 50 which is connected, in series with the resistor 12, in parallel with the feedback resistor 25.

The switch 17 used in this typical implementation of the control circuit 21 is constituted by a junction field-effect transistor (JFET). The JFET 17 acts as a closed switch when its gate lead 26 is at an electric potential that is more positive than that appearing at its source lead 27, which is the ground potential. A drain lead 28 of the JFET 17 is connected by the connecting line 18 with the juncture of the one terminal 10 of the capacitor 9 with the resistor 12.

The detector/pulse generator 19 includes a capacitor 29, a resistor 30, a diode 31 and another resistor 32. The capacitor 29 and the resistor 30 are connected in series between the positive and negative output terminals 2 and 3 of the electric power source 1, while the diode 31 is arranged in parallel with the resistor 30 and the resistor 32 is interposed between a juncture 33 of the capacitor 29, the resistor 30 and the diode 31, and the gate lead 26 of the JFET 17.

In operation, when the electric power is turned off, the positive and negative source terminals 2 and 3 are coupled to one another and to the ground through low impedances existing in the electric power source 1. This causes the capacitor 29 to discharge very quickly through the diode 31. The purpose of this is to "reset" the pulse generator 19 as soon as possible after the electric power supply is interrupted.

When the electric power supply is subsequently restored, the capacitor 29 is in its discharged condition. Inasmuch as the voltage across the capacitor 29 cannot change instantaneously, especially since the diode 31 is not conductive in this direction and the resistance of the resistor 30 impedes the flow of electric current via the resistor 30 to the capacitor 29, the gate lead 26 of the JFET 17 is brought to a positive potential, and the JFET 17 turns on. This ties the one terminal 10 of the capacitor 9 to the ground through the JFET 17. When this connection is established, the capacitor 9 is rapidly charged up to the proper voltage by the operational amplifier 5. The relatively small resistor 12 that is interposed between the capacitor 9 and the negative or inverting input 7 of the operational amplifier 5 prevents grounding of the inverting input 7, which would cause the control circuit 21 to malfunction. However, since the inverting input 7 is very close in potential to the ground, no current of any significance flows through the resistor 12.

After the supply of electric power has been restored, the capacitor 29 of the pulse generator 19 starts to be charged through the resistor 30. Thus, the voltage applied to the gate lead 27 of the JFET 17 eventually drops below the ground potential, and the JFET 17 becomes nonconductive, thus disconnecting the one terminal 10 of the capacitor 9 from the ground. When this happens, the operation of the circuit 21 is the same as it would be if the switch 17 (the JFET) was not provided in the first place.

While the present invention has been illustrated and described as embodied in a particular construction of the control circuit arrangement as employed for controlling the position of an aircraft control surface member, it will be appreciated that the present invention is not limited to this particular example; rather, the scope of protection of the present invention is to be determined solely from the attached claims.

We claim:

1. An arrangement for controlling the position of an aircraft control surface member, comprising:
  means for supplying electric power;
  means for issuing an electric input signal having a value that is indicative of the desired position of the control surface member at least while electric power is being supplied by said supplying means;
  means for amplifying said input signal, including an input terminal receiving said input signal and an output terminal carrying an output signal;
  means connected to said output terminal and operative for positioning the control surface member in dependence on said output signal;
  means for storing electric charge, including one terminal connected to said input terminal of said amplifying means and another terminal connected to said output terminal, said storing means being discharged upon interruption of the supply of electric power by said supplying means and recharged with a predetermined time constant upon restoration of such supply;

means for detecting the restoration of the supply of electric power by said supplying means and issuing a switching signal for a predetermined time interval immediately following such restoration; and means for recharging said storing means to said correct value immediately after the restoration with a time constant amounting at most to a small fraction of said predetermined time constant, including means for grounding said one terminal of said storing means in response to and for the duration of said switching signal.

2. The arrangement as defined in claim 1, wherein said storing means includes at least one capacitor.

3. The arrangement as defined in claim 1, wherein said grounding means includes a switch interposed between said one terminal of said storing means and the ground.

4. The arrangement as defined in claim 3, wherein said switch is a field effect transistor having a source lead connected to the ground, a drain lead connected to said one terminal of said storage means, and a gate lead connected to said detecting means.

5. The arrangement as defined in claim 3, wherein said switch is connected to said one terminal of said storage means; and further comprising an electric resistor interposed between said switch and said input terminal of said amplifying means.

6. The arrangement as defined in claim 3, wherein said supplying means has positive and negative terminals; and wherein said detecting means includes a resistor and a capacitor connected in series between said negative and positive terminals of said supplying means and a diode arranged in parallel with said resistor between said negative terminal and a node located between said resistor and said capacitor, said node being connected to said switch.

7. The arrangement as defined in claim 1, wherein said amplifying means includes an operational amplifier having a negative input constituting said input terminal and an output constituting said output terminal of said storage means and a positive input connected to the ground, and a resistor connected in a feedback loop between said output and said negative input of said amplifier.

8. An arrangement for controlling an actuator that adjusts the position of a movable member in dependence on the value of an electric control signal when electric power is being supplied thereto from a source, comprising means for amplifying the control signal, including an input terminal receiving the control signal and an output terminal carrying an output signal;

means connected to said output of said amplifying means at a juncture and operative for conducting an output signal received from said output terminal to the actuator;

means for storing electric charge, including one terminal connected to said input terminal of said amplifying means and another terminal connected to said output terminal, said storing means being discharged upon interruption of the supply of electric power by the source and recharged with a predetermined time constant upon restoration of such supply;

means for detecting the restoration of the supply of electric power by the source and issuing a switching signal for a predetermined time interval immediately following such restoration; and means for recharging said storing means to said correct value immediately after the restoration with a time constant amounting at most to a small fraction of the predetermined time constant, including means for grounding said one terminal of said storing means in response to and for the duration of said switching signal.

9. The arrangement as defined in claim 8, wherein said storing means includes at least one capacitor.

10. The arrangement as defined in claim 8, wherein said grounding means includes a switch interposed between said one terminal of said storing means and the ground.

11. The arrangement as defined in claim 10, wherein said switch is a field effect transistor having a source lead connected to the ground, a drain lead connected to said one terminal of said storage means, and a gate lead connected to said detecting means.

12. The arrangement as defined in claim 10, wherein said switch is connected to said one terminal of said storage means; and further comprising an electric resistor interposed between said switch and said input terminal of said amplifying means.

13. The arrangement as defined in claim 10, wherein said supplying means has positive and negative terminals; and wherein said detecting means includes a resistor and a capacitor connected in series between said negative and positive terminals of said supplying means and a diode arranged in parallel with said resistor between said negative terminal and a node located between said resistor and said capacitor, said node being connected to said switch.

14. The arrangement as defined in claim 8, wherein said amplifying means includes an operational amplifier having a negative input constituting said input terminal and an output constituting said output terminal of said storage means and a positive input connected to the ground, and a resistor connected in a feedback loop between said output and said negative input of said amplifier.

* * * * *